(12) United States Patent
Chen (10) Patent No.: US 8,159,459 B2
(45) Date of Patent: Apr. 17, 2012

(54) COORDINATE POSITIONING SYSTEM AND METHOD WITH IN-THE-AIR POSITIONING FUNCTION

(75) Inventor: Li-Ming Chen, Keelung (TW)

(73) Assignee: Sunplus mMedia Inc., Hsinchu (TW)

( * ) Notice: Subject to any disclaimer, the term of this patent is extended or adjusted under 35 U.S.C. 154(b) by 891 days.

(21) Appl. No.: 12/222,677

(22) Filed: Aug. 14, 2008

(65) Prior Publication Data

US 2009/0046063 A1 Feb. 19, 2009

(30) Foreign Application Priority Data

Aug. 14, 2007 (TW) .............................. 96129962 A (51) Int. Cl.
*G06F 3/033* (2006.01)
(52) U.S. Cl. .......... 345/158; 345/156; 345/157; 463/36; 463/37
(58) Field of Classification Search .......... 345/156–158, 345/180–183; 463/36–45
See application file for complete search history.

(56) References Cited

U.S. PATENT DOCUMENTS

| | | | |
|---|---|---|---|
| 6,110,039 A * | 8/2000 | Oh | 463/2 |
| 2002/0107069 A1* | 8/2002 | Ishino | 463/30 |
| 2004/0009798 A1* | 1/2004 | Okuda et al. | 463/7 |
| 2007/0052177 A1 | 3/2007 | Ikeda et al. | |
| 2007/0060336 A1* | 3/2007 | Marks et al. | 463/30 |
| 2007/0213127 A1* | 9/2007 | Sato | 463/36 |
| 2007/0222750 A1* | 9/2007 | Ohta | 345/158 |
| 2010/0253622 A1* | 10/2010 | Makita | 345/158 |

* cited by examiner

*Primary Examiner* — Amare Mengistu
*Assistant Examiner* — Koosha Sharifi-Tafreshi
(74) *Attorney, Agent, or Firm* — Bacon & Thomas, PLLC (57) ABSTRACT

A coordinate positioning system with in-the-air positioning function includes an illuminator and an image sensor. The illuminator produces a directional light. The image sensor receives the directional light produced by the illuminator and produces an image corresponding to the directional light to accordingly analyze the image and obtain a rotating angle corresponding to the directional light.

12 Claims, 9 Drawing Sheets

COORDINATE POSITIONING SYSTEM AND METHOD WITH IN-THE-AIR POSITIONING FUNCTION

BACKGROUND OF THE INVENTION

1. Field of the Invention

The present invention relates to the technical field of image positioning system and, more particularly, to a coordinate positioning system and method with in-the-air positioning function.

2. Description of Related Art

In the positioning system of a typical game host for CRT screen, a light gun is equipped with a sensor to receive a signal in a local region aimed by the light gun. Thus, the sensor of the light gun can sense the signal when the CRT screen scans the local region aimed by the light gun. In addition, the light gun contains a timer to count time as soon as a frame displayed on the CRT screen is scanned at a start of the left upper corner, and the timer is restarted when the entire frame is scanned completely. When a game player aims the light gun at a target, the timer can record the time of scanning from the left upper corner to the target by a scan signal of the CRT screen, and accordingly the coordinate of the target can be computed. However, such a positioning system is likely to cause a significant error. Further, due to the principle of the interlaced frame display in the CRT screen, and the positioning system for the CRT screen is not suitable for the LCD TV and requires a redesign.

Figure 1:
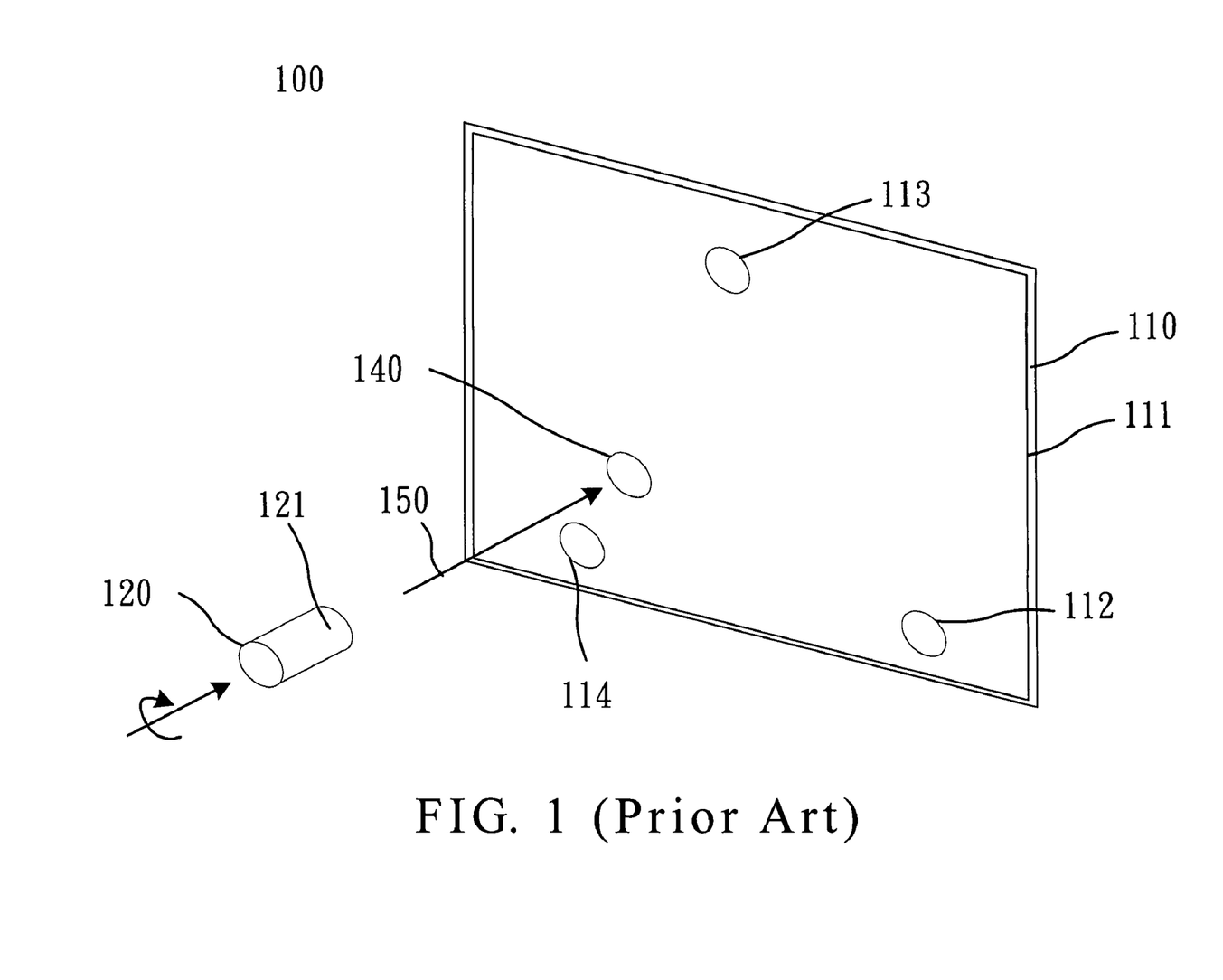
FIG. 1 is a schematic view of a typical image positioning system.

FIG. 1 is a schematic view of a typical image positioning system 100, which consists of an image display 110 and an image sensor 120. The image display 110 includes LEDs 112, 113 and 114 to be assigned with the identification codes "first", "second" and "third" respectively, and to be isogonally distributed on a plane 111. The image sensor 120 includes a photosensor 121 formed by CMOS.

The photosensor 121 detects and receives the light sources of the LEDs 112, 113 and 114, and finds the virtual coordinate 140 aimed by the image sensor 120 according to the coordinates of the LEDs 112, 113 and 114.

The LEDs 112 to 114 can be implemented on the corners of a large projector or LCD screen. In this case, the plane 111 can be an imaging plane of a screen, and the image sensor 120 can be used as a projection pen or mouse by an operator. When the operator aims the image sensor 120 at the screen, the virtual coordinate 140 aimed by the image sensor 120 is the position of a light spot indicated by the projector pen or the position of a cursor manipulated by the mouse. The identification codes of the LEDs 112, 113 and 114 are identified, and the virtual coordinate 140 is well computed according to the coordinates of the LEDs sequentially corresponding to the respective identification codes.

Figure 2:
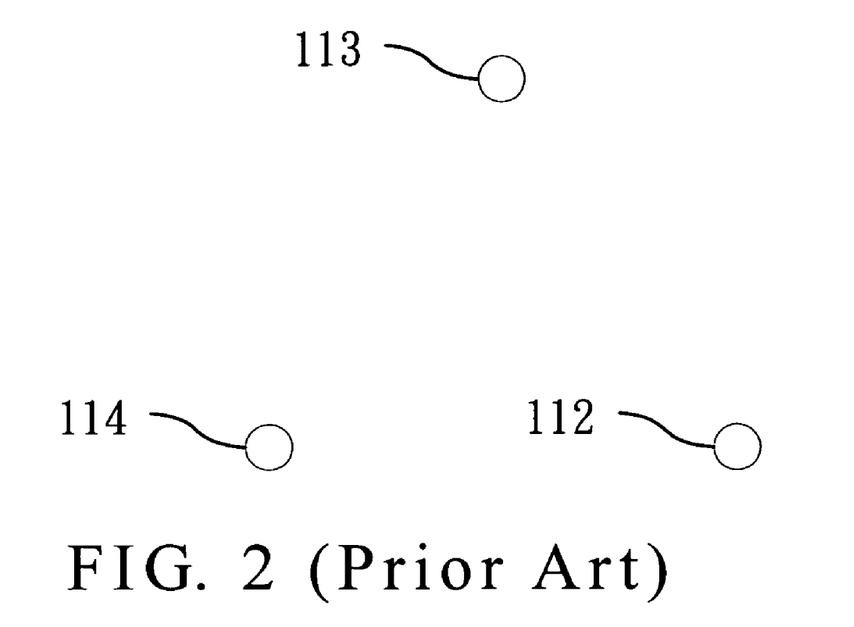
FIG. 2 shows a schematic graph of a mapped image produced by the typical image positioning system of FIG. 1.
Figure 3:
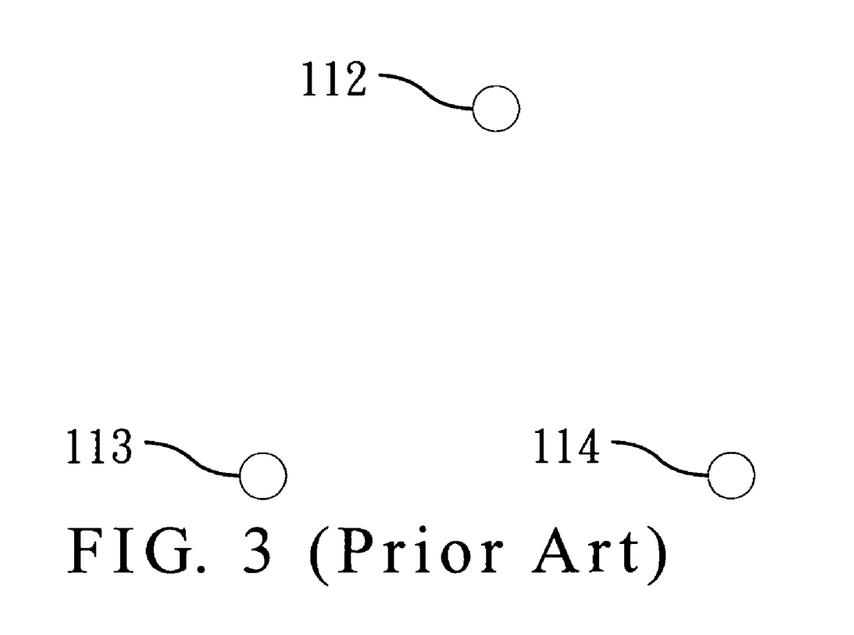
FIG. 3 shows a schematic graph of another mapped image produced by the typical image positioning system of FIG. 1.

The image sensor 120 detects the LEDs 112, 113 and 114 and produces a mapping image, as shown in FIG. 2. For a typical condition, the image sensor 120 identifies the identification codes of the LEDs 112, 113 and 114 according to the coordinates, which starts at the right-down corner in the reverse clock direction to sequentially find the codes "first", "second" and "third". For convenient description, the following is referred to as a first LED 112, a second LED 113 and a third LED 114. When the image sensor 120 rotates 120 degrees with respect to the arrow 150 shown in FIG. 1, a mapped image is produced shown in FIG. 3. In this case, FIGS. 2 and 3 have same mapped images, and the identification codes of the first to third LEDs 112 to 114 are mistakenly identified when the identification is taken from the right down corner in the reverse clock direction as usual. For example, after the 120-degree rotation, the identification code of the third LED 114 is shifted to the right down corner and mistaken as "first". Similarly, the identification code of the LED 112 is mistaken as "second", and the identification code of the LED 113 is mistaken as "third". Therefore, the typical positioning system cannot correctly obtain the corresponding virtual coordinate 140 when the image sensor 120 is rotated by a certain angle.

Accordingly, another prior art applies at least three light-producible positioning units that locate in different lines and have different identification codes, and an auxiliary unit. The auxiliary unit locates on the connection of the first positioning unit and the second positioning unit. An image sensor receives the light produced respectively by the first positioning unit, the second positioning unit, the third positioning unit and the auxiliary unit, and accordingly obtains a space coordinate. The identification codes of the positioning units are obtained according to the space relation of the positioning units to the auxiliary unit. The coordinates of the positioning units sequentially corresponding to the identification codes are used to properly perform the directional positioning procedure. Such a way can avoid the problem that the typical positioning system cannot accurately obtain the virtual coordinate 140 pointed by the image sensor 120, but it needs to implement a plurality of the positioning and auxiliary units on the screen of the display, which affects the appearance of the screen and the imaging on the screen.

Figure 4:
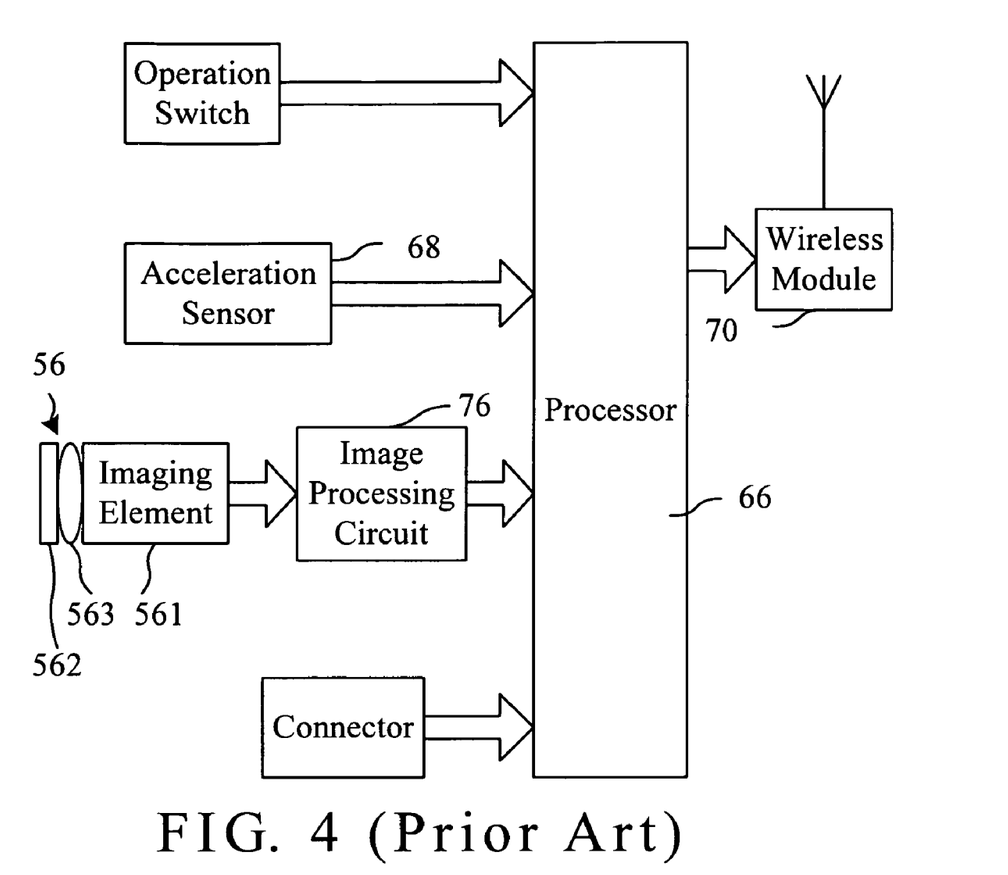
FIG. 4 is a block diagram of another typical image positioning system.

FIG. 4 is a block diagram of an image positioning system disclosed in US Patent Publication No. 20070052177 entitled "Game operating device". In FIG. 4, the system includes an infrared imaging device 56 and an image processing circuit 76. The image processing circuit 76 processes the image data obtained by the infrared imaging device 56. The infrared imaging device 56 includes a solid imaging element 561, an infrared filter 562 and a lens 563. The infrared imaging device 56 senses a high-intensity portion, detects the portion's center-of-gravity position and area, and outputs the corresponding data. The image processing circuit 76 outputs the corresponding data to a processor 66. The acceleration sensor 68 outputs the two-axis or three-axis acceleration data to the processor 68.

Figure 5:
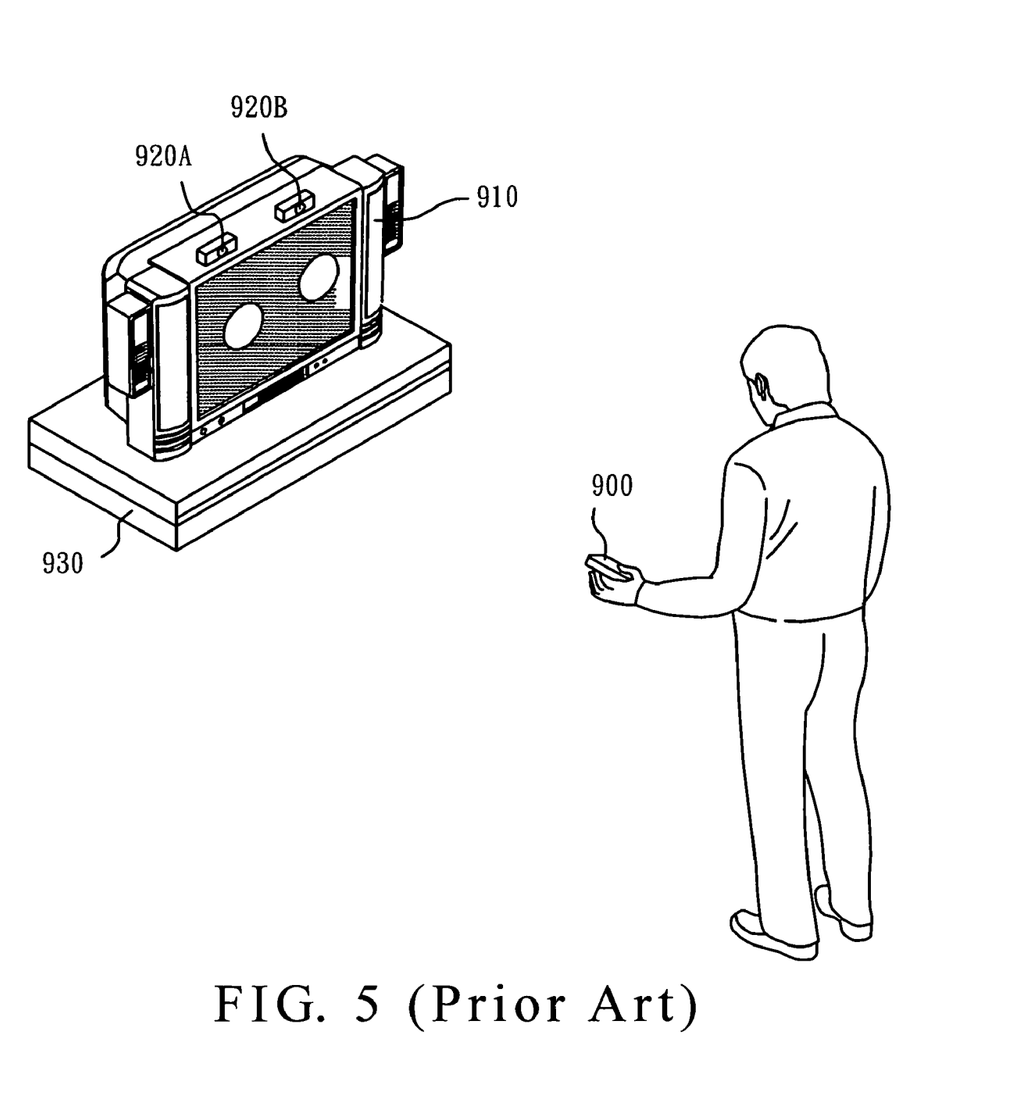
FIG. 5 is a schematic view of using the image positioning system of FIG. 4.

FIG. 5 is a schematic view of using the image positioning system of FIG. 4. As shown in FIG. 5, the LED modules 920A, 920B are implemented on top of a CRT TV 910. The infrared imaging device 56 senses the LED modules 920A and 920B, detects the center-of-gravity positions and areas, and outputs the corresponding data. A remote control 900 transmits the corresponding data and the two-axis or three-axis acceleration data to a game machine 930 through a wireless module 70. The game machine 930 accordingly computes the position of the remote control 900. However, the positioning system requires an additional acceleration sensor 68, which increases the hardware cost.

Therefore, it is desirable to provide an improved positioning system and method to mitigate and/or obviate the aforementioned problems.

SUMMARY OF THE INVENTION

An object of the present invention is to provide a coordinate positioning system and method with in-the-air positioning function, which can avoid the positioning error produced in the prior art when the image sensor has a rotating angle.

Another object of the present invention is to provide a coordinate positioning system and method with in-the-air positioning function, which can prevent the screen from being interfered by the LED implemented on the screen of the display.

According to a feature of the invention, a coordinate positioning system with in-the-air positioning function is provided. The system includes an illuminator and an image sensor. The illuminator produces a directional light. The image sensor senses the directional light produced by the illuminator and produces an image corresponding to the directional light to accordingly analyze the image and obtain a rotating angle corresponding to the directional light.

According to a feature of the invention, a coordinate positioning method with in-the-air positioning function is provided, which computes a rotating angle corresponding to a directional light produced by an illuminator and sensed by an image sensor. The method includes: a receiving step, which uses the image sensor to sense the directional light produced by the illuminator; an imaging step, which converts the directional light into an electrical signal and produces an image corresponding to the directional light according to the electrical signal; a bi-level image processing step, which performs a bi-level image pre-processing on the image to thereby produce a bi-level image; an image object capturing step, which captures image objects corresponding to the directional light from the bi-level image and accordingly produces a working image object; and a computing step, which computes a direction of the working image object to thereby obtain the rotating angle.

Other objects, advantages, and novel features of the invention will become more apparent from the following detailed description when taken in conjunction with the accompanying drawings.

DETAILED DESCRIPTION OF THE PREFERRED EMBODIMENT

Figure 6:
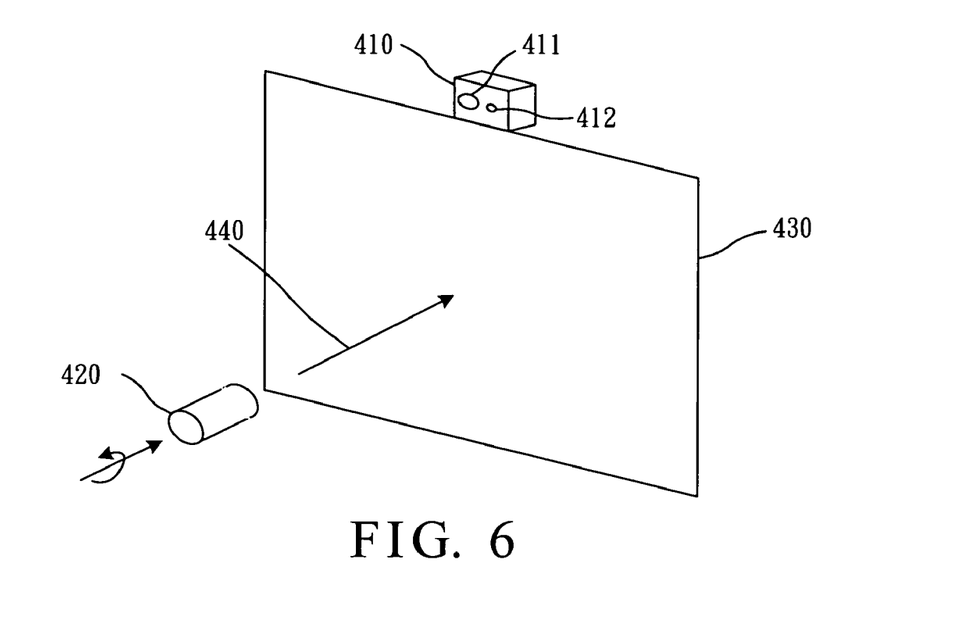
FIG. 6 is a schematic view of a coordinate positioning system with in-the-air positioning function according to the invention.

FIG. 6 is a schematic view of a coordinate positioning system with in-the-air positioning function according to the invention. The system includes an illuminator 410 and an image sensor 420.

The illuminator 410 produces a directional light. In this embodiment, the illuminator 410 is comprised of a large LED 411 and a small LED 412 to thereby produce the directional light. In other embodiments, the illuminator 410 can be comprised of a first LED with a pre-determined shape and a second LED with a shape different from the first LED, so as to produce the directional light.

As shown in FIG. 6, the illuminator 410 producing the directional light can be disposed above the screen 430 of the display without affecting the image displayed on the screen 430.

The image sensor 420 receives the directional light produced by the illuminator 410 and produces an image corresponding to the directional light to accordingly analyze the image and obtain a rotating angle corresponding to the directional light.

Figure 7:
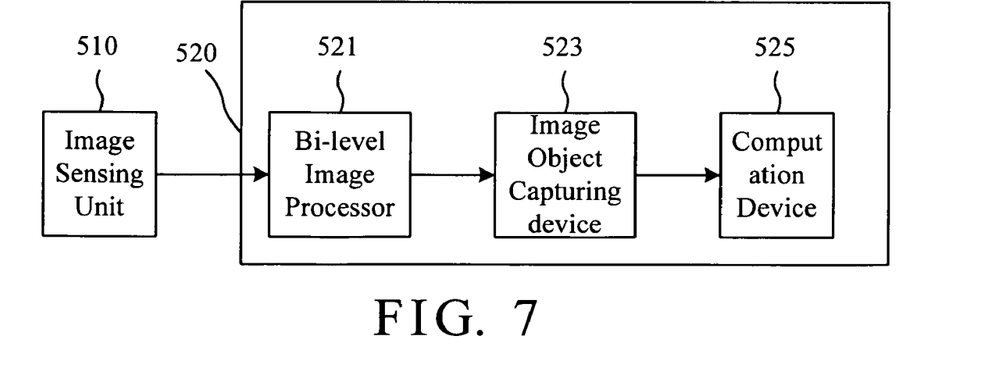
FIG. 7 is a block diagram of the coordinate positioning system of FIG. 6 according to the invention.

FIG. 7 is a block diagram of the image sensor 420. The image sensor 420 includes an image sensing unit 510 and a processing unit 520. The image sensing unit 510 receives the directional light produced by the illuminator 410, converts the light into an electrical signal, and produces an image corresponding to the directional light according to the electrical signal.

The image sensing unit 510 is preferably a CMOS image sensor. Alternatively, the image sensing unit 510 can be a charge coupled device (CCD).

The processing unit 520 is connected to the image sensing unit 510 in order to perform a bi-level image pre-processing to thereby produce a bi-level image. The processing unit 520 captures image objects corresponding to directional light from the bi-level image to accordingly produce the rotating angle corresponding to the directional light.

The processing unit 520 includes a bi-level image processor 521, an image object capturing device 523 and a computation device 525. The bi-level image processor 521 is connected to the image sensing unit 510 in order to perform the bi-level image pre-processing on the image and produce the bi-level image.

The image object capturing device 523 is connected to the bi-level image processor 521 in order to capture the image objects corresponding to the directional light from the bi-level image and produce a working image object. The computation device 525 is connected to the image object capturing device 523 in order to compute a center of gravity and a direction of the working image object to accordingly produce the rotating angle θ corresponding to the directional light.

The computation device 525 is based on the direction and a predetermined vector $\vec{B}$ to produce the rotating angle θ corresponding to the directional light. The rotating angle θ can be expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '•' indicates an inner product operation.

Figure 8:
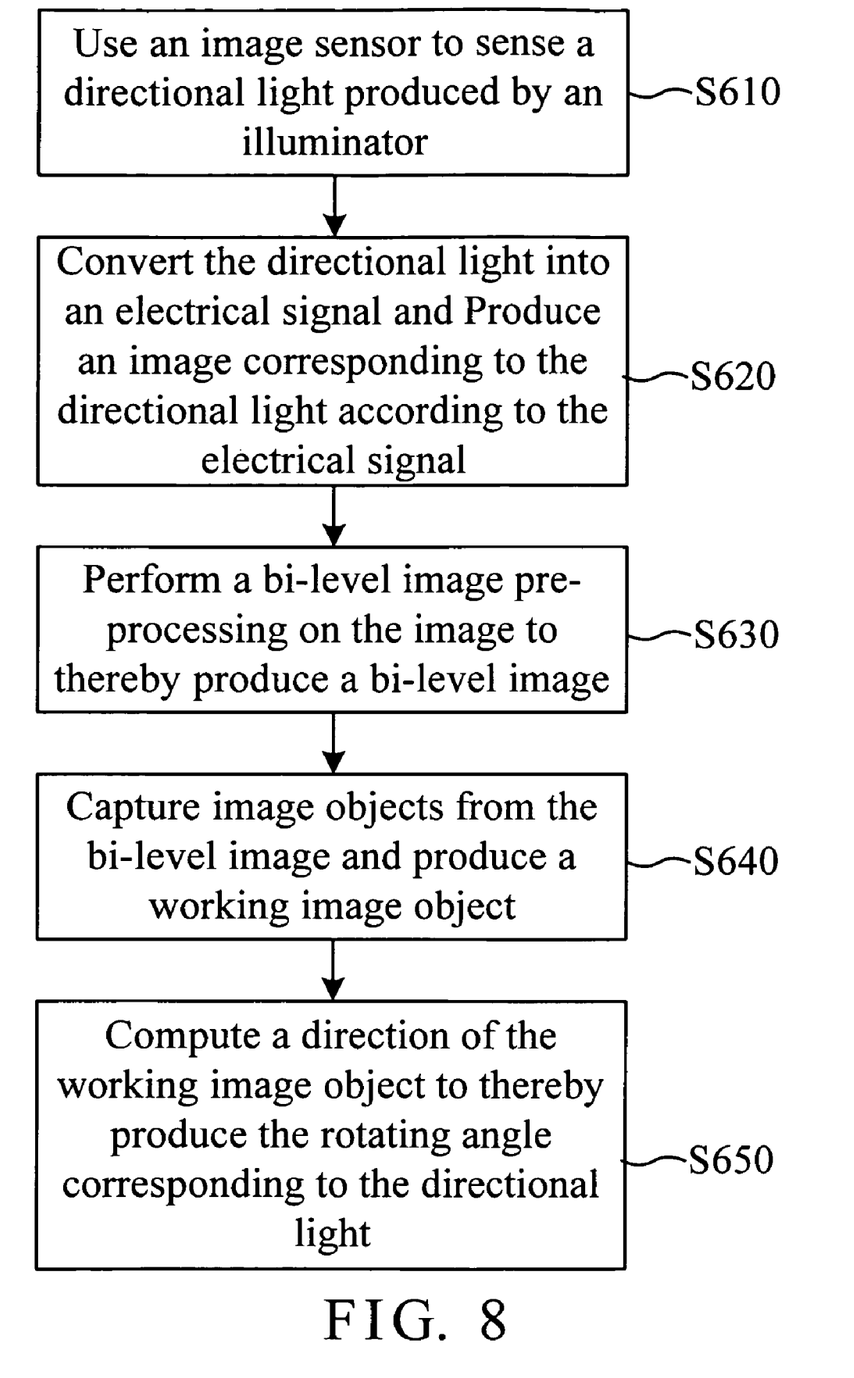
FIG. 8 is a flowchart of a coordinate positioning method with in-the-air positioning function according to the invention.

FIG. 8 is a flowchart of a coordinate positioning method with in-the-air positioning function according to the invention, which computes a rotating angle corresponding to a directional light produced by an illuminator 410 and sensed by an image sensor 420. First, step S610 uses the image sensor 420 to receive the directional light produced by the illuminator 410.

Figure 9:
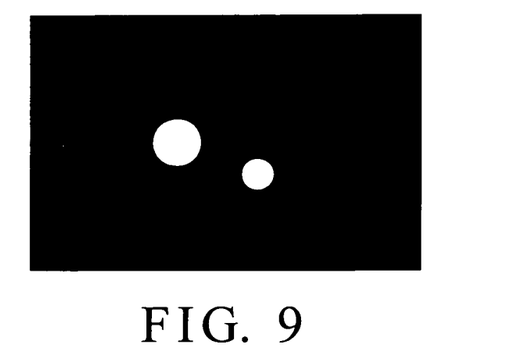
FIG. 9 is a schematic view of sensed images of an image positioning system according to the invention.
Figure 10:
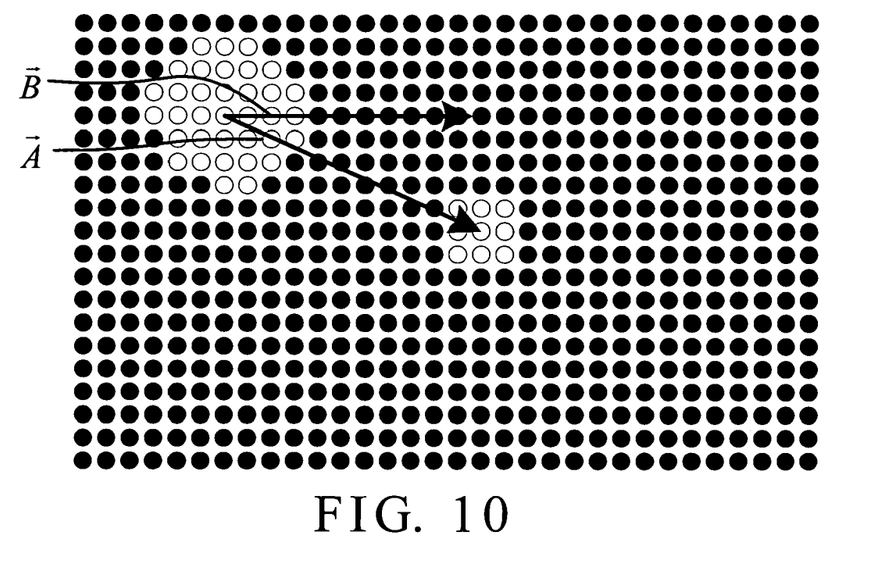
FIG. 10 is an enlarged view of the sensed images of FIG. 9 according to the invention.

Step S620 converts the directional light into an electrical signal and produces an image corresponding to the directional light according to the electrical signal. When the image sensor 420 counterclockwise rotates θ with respect to the axis indicated by the arrow 440 of FIG. 6, the image output is shown in FIG. 9. As shown in FIG. 9, two white areas are the images of the LEDs 411 and 412. FIG. 10 is an enlarged view of the sensed images of the LEDs 411 and 412 in FIG. 9. As shown in FIG. 10, the image sensor 420 presents the light respectively produced by the LEDs 411 and 412 at the white sensing pixels and otherwise at the black ones. In this case, the white sensing pixels have a gray level approximately greater than 200, and the black sensing pixels have a gray level approximately smaller than 50.

Step S630 performs the bi-level image pre-processing on the image to thereby produce a bi-level image, which is produced by the following pseudo-code:

```
if(pix_value > 150)
   then pix_value = 255
elseif(pix_value < 70)
   then pix_value = 0
endif
``` where pix_value indicates a pixel value. Namely, a pixel value is set to 255 when it is greater than 150 and to zero when it is smaller than 75. Thus, the bi-level image is formed.

Step S640 captures image objects corresponding to the directional light from the bi-level image and accordingly produces a working image object. Step S640 essentially captures the image objects of the LEDs 411 and 412. Accordingly, the image objects of the LEDs 411 and 412 respectively have a center and an area just included in a minimum rectangle to be captured. Namely, the minimum rectangle is a minimized rectangle containing the images of the LEDs 411 and 412. In this embodiment, the areas of the image objects are used to determine one that is the image object of the large LED 411 and the other that is the image object of the small LED 412.

Step S650 computes a direction of the working image object to thereby produce the rotating angle θ corresponding to the directional light. In this embodiment, the center of the image object of the large LED 411 is defined as the start point, and that of the small LED 412 is defined as the end point. The start point is connected to the end point to thereby form the vector of the direction. Next, the rotating angle θ corresponding to the directional light is produced according to the direction and a predetermined vector $\vec{B}$, where the predetermined vector is the horizontal line of the bi-level image sensed by the image sensor 420. The rotating angle θ can be expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

Figure 11:
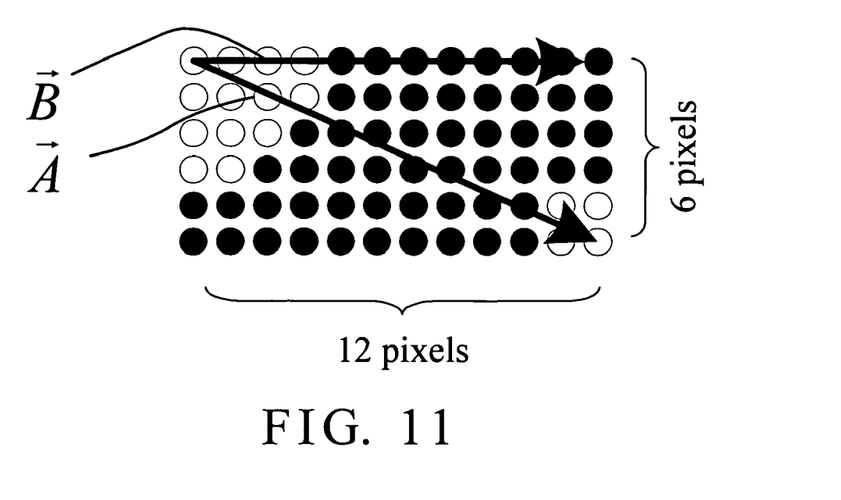
FIG. 11 is a partial enlarged view of FIG. 10.
Figure 12:
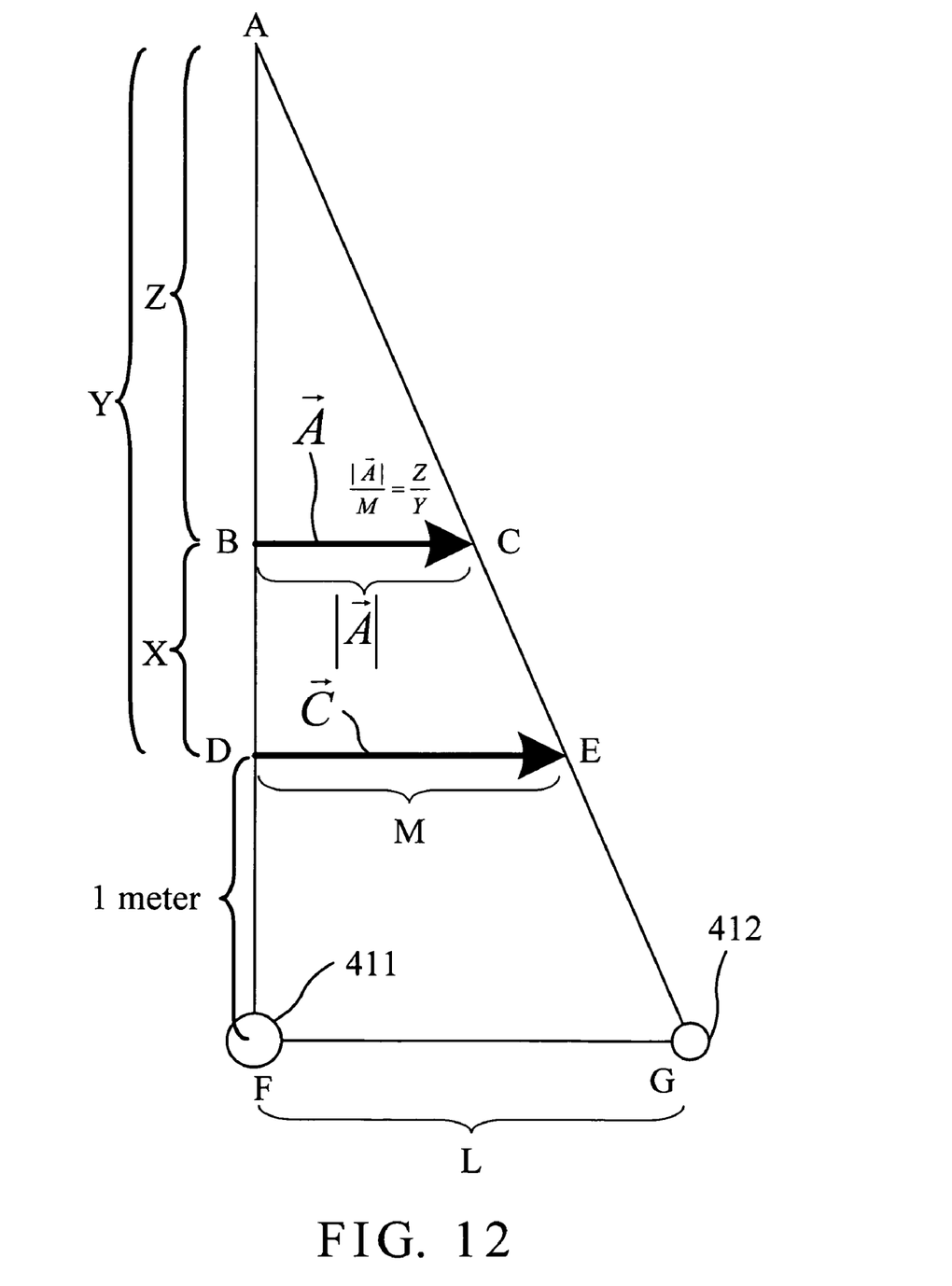
FIG. 12 is a schematic graph of computing a relative distance from an illuminator to an image sensor.

The invention defines the center of the image object of the large LED as the start point and that of the small LED as the end point to thereby produce the direction, and also defines the centers of the start and end points as a nucleus for positioning. The invention uses the rotating angle θ, the positions of the nucleuses and the distance from the start point to the end point to find a final absolute positioning coordinate. The invention uses a triangle ranging method to convert the distance from the start point to the end point into a relative distance from the illuminator 410 to the image sensor 420. FIG. 11 is a partial enlarged view of FIG. 10. As shown in FIG. 11, the length $|\vec{A}|$ of the vector $\vec{A}$ of the direction has $\sqrt{12^2 + 6^2} = \sqrt{180}$ pixels long. FIG. 12 is a schematic graph of computing the relative distance from the illuminator 410 to the image sensor 420. As shown in FIG. 12, the vector $\vec{C}$ is a vector of pre-measuring the image sensor 420 and the illuminator 410 that is obtained by capturing the center of the image object of the large LED as the start point and that of the small LED as the end point at a distance of one meter far from the large LED and connecting from the start point to the end point. The length of the vector $\vec{C}$ has M pixels long. The distance from the large LED 411 to the small LED 412 is set to L meters. For ΔADE~ΔAFG, we have $$\frac{M}{L} = \frac{Y}{Y+1} \text{ and } Y = \frac{M}{L-M}.$$

Further, for ΔADE~ΔABC, we have $$\frac{|\vec{A}|}{M} = \frac{Z}{Y} \text{ and } Z = Y \times \frac{|\vec{A}|}{M}.$$

Therefore, the image sensor 420 and the illuminator 410 have a distance of X+1=(Y−Z)+1. Such a triangle ranging application can be easily accomplished by a person skilled in the art according to the description of the invention, and thus no more detail is described.

In the embodiment above, the illuminator 410 is comprised of the large and the small LEDs 411 and 412 to produce the directional light.

Figure 13:
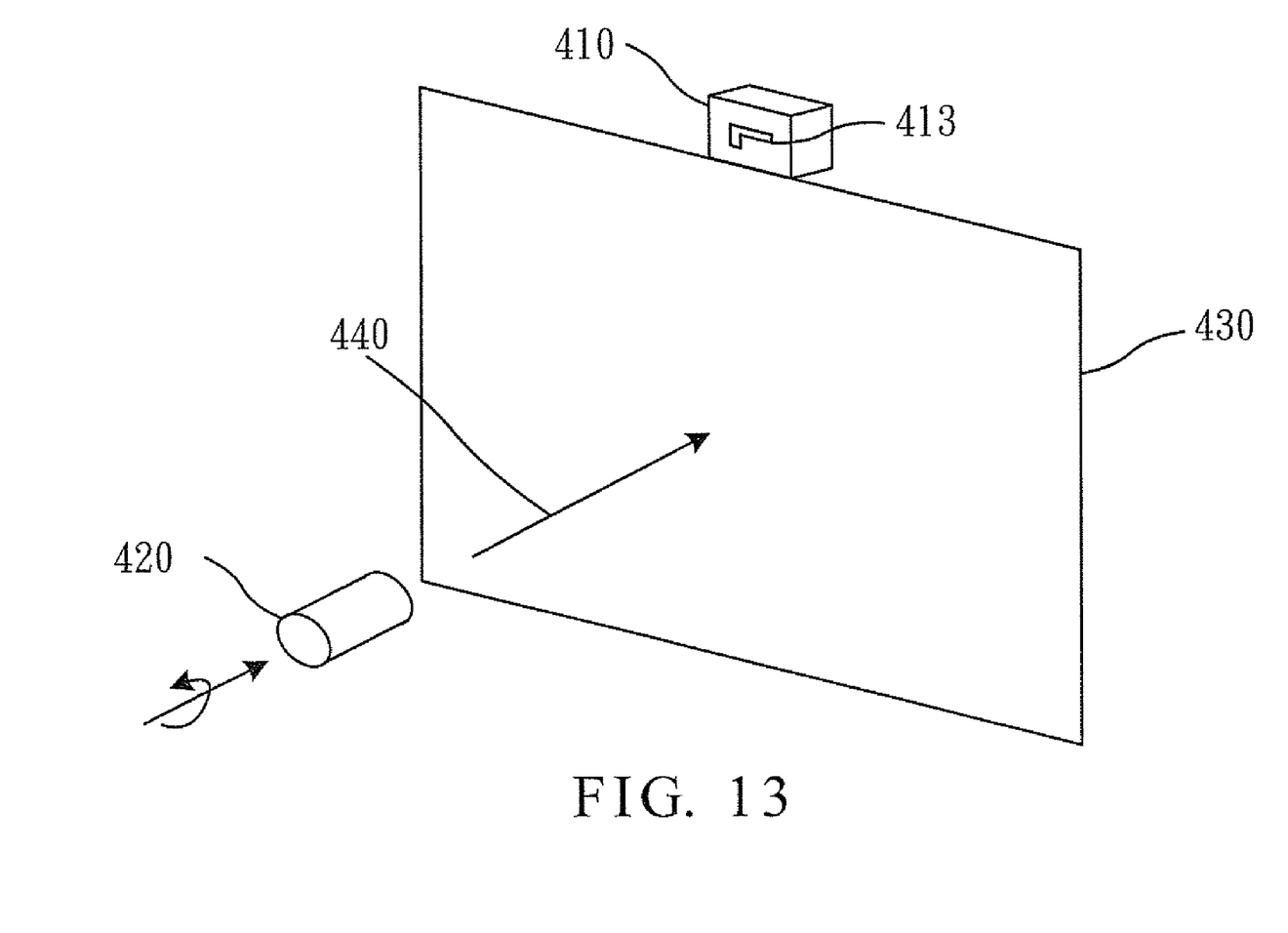
FIG. 13 is another schematic view of a coordinate positioning system with an in-the-air positioning function.

In other embodiments, the illuminator 410 can be an L-shaped LED 413, as show in FIG. 13, or comprised of a first LED with a pre-determined shape and a second LED with a shape different from the first LED, so as to produce the directional light.

The corresponding bi-level image processing step, image object capturing step and the computing step can be easily accomplished by a person skilled in the art, and thus no more detail is described.

It is known that the prior art requires three or more light sources implemented on the screen 430 to thereby provide the rotating angle and positioning coordinate of the image sensor 420 with respect to the screen 430. Such a configuration can affect the screen 430 at the appearance and the content of displaying film. In contrast, the invention can use fewer light sources than the prior art to compute the rotating angle and positioning coordinator.

In addition, the prior art requires two light sources to cooperate with the acceleration sensor such as G-Sensor, to obtain the absolute coordinate of positioning. In contrast, the invention does not require the acceleration sensor, and instead uses the illuminator 410 to produce the directional light. Accordingly, the corresponding positions and area shapes of spots produced by the directional light are analyzed to obtain a new directional coordinator and relative distance.

As cited, the invention uses the illuminator above the screen 430 to produce the directional light and the image sensor to sense the images produced by the illuminator and to analyze the corresponding positions and area shapes of the spots for obtaining the new directional coordinate and relative distance. The technique can be used as an input of a remote control or wireless mouse to thereby control the position and special action with respect to the screen. When the technique is applied to the remote control, the problem that the remote control cannot effectively position the absolute coordinate on an LCD screen can be overcome, and the available information such as a relative distance from the remote control to the LCD screen can be provided.

Although the present invention has been explained in relation to its preferred embodiment, it is to be understood that many other possible modifications and variations can be made without departing from the spirit and scope of the invention as hereinafter claimed.

What is claimed is:

1. A coordinate positioning system with in-the-air positioning function for an LCD display unit, comprising:

an illuminator, which produces a directional light; and an image sensor, which senses the directional light and produces an image corresponding to the directional light to accordingly analyze the image to obtain a rotating angle corresponding to the directional light, wherein the image sensor includes:

an image sensing unit, which converts the directional light into an electrical signal, and produces an image corresponding to the directional light according to the electrical signal; and a processing unit, which is connected to the image sensing unit, wherein the processing unit comprises:

a bi-level image processor, which is connected to the image sensing unit, in order to perform the bi-level image pre-processing on the image and to further produce the bi-level image;

an image object capturing device, which is connected to the bi-level image processor in order to capture the image objects corresponding to the directional light from the bi-level image and to produce a working image object; and a computation device, which is connected to the image object capturing device, in order to compute a direction of the working image object to accordingly produce the rotating angle corresponding to the directional light, wherein the computation device produces the rotating angle according to the direction and a predetermined vector, and the rotating angle θ is expressed as:

$$\theta = \cos^{-1}\left(\frac{\vec{A} \cdot \vec{B}}{|\vec{A}||\vec{B}|}\right),$$

Where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

2. The system as claimed in claim 1, wherein the image sensing unit is a complementary metal oxide semiconductor (CMOS) image sensor.

3. The system as claimed in claim 1, wherein the illuminator is comprised of a first LED and a second LED to accordingly produce the directional light, and the size of first LED is larger than the size of second LED.

4. The system as claimed in claim 3, wherein a center of the image object of the first LED is defined as a start point while a center of the image object of the second LED is defined as an end point, and thus the vector of the direction is defined by connecting from the start point to the end point.

5. The system as claimed in claim 1, wherein the illuminator is comprised of an L-shaped LED to produce the directional light.

6. The system as claimed in claim 1, wherein the illuminator is comprised of a first LED with a pre-determined shape and a second LED with a shape different from the first LED to produce the directional light.

7. A coordinate positioning system with in-the-air positioning function for an LCD display unit, the method comprising:

a receiving step, which uses an image sensor to sense a directional light produced by an illuminator;

an imaging step, which converts the directional light into an electrical signal and produces an image corresponding to the directional light according to the electrical signal;

a bi-level image processing step, which performs a bi-level image pre-processing on the image to thereby produce a bi-level image;

an image object capturing step, which captures image objects corresponding to the directional light from the bi-level image and accordingly produces a working image object; and a computing step, which computes a direction of the working image object to thereby obtain a rotating angle;

wherein the computing step produces the rotating angle according to the direction and a predetermined vector, and the rotating angle θ is expressed as:

$$\theta = \cos^{-1}\left(\frac{\vec{A} \cdot \vec{B}}{|\vec{A}||\vec{B}|}\right),$$

where '$\vec{A}$' indicates a vector of the direction, '$\vec{B}$' indicates the predetermined vector, '$|\vec{A}|$' indicates a length of the vector, '$|\vec{B}|$' indicates a length of the predetermined vector, and '●' indicates an inner product operation.

8. The method as claimed in claim 7, wherein the image sensing unit is a CMOS image sensor.

9. The method as claimed in claim 7, wherein the illuminator is comprised of a first LED and a second LED to accordingly produce the directional light, and the size of first LED is larger than the size of second LED.

10. The method as claimed in claim 9, wherein a center of the image object of the first LED is defined as a start point while a center of the image object of the second LED is defined as an end point, and thus the vector of the direction is defined by connecting from the start point to the end point.

11. The method as claimed in claim 7, wherein the illuminator is comprised of an L-shaped LED to produce the directional light.

12. The method as claimed in claim 7, wherein the illuminator is comprised of a first LED with a pre-determined shape and a second LED with a shape different from the first LED to produce the directional light.

* * * * *